June 3, 1969 R. C. OWENS 3,448,323

TELEVISION KINESCOPE VOLTAGE CABLE ASSEMBLY

Filed April 26, 1965

INVENTOR.
RAYMOND C. OWENS
BY
Eugene M. Whitacre
Attorney

United States Patent Office 3,448,323
Patented June 3, 1969

3,448,323

TELEVISION KINESCOPE VOLTAGE CABLE ASSEMBLY

Raymond C. Owens, Carmel, Ind., assignor to Radio Corporation of America, a corporation of Delaware Filed Apr. 26, 1965, Ser. No. 450,972
Int. Cl. H01j 29/98, 23/34, 29/02
U.S. Cl. 315—1 1 Claim

ABSTRACT OF THE DISCLOSURE

A cable assembly for providing a relatively small parallel capacitance and an insulated current limiting resistor for connecting a high voltage rectifier to an ultor electrode of a cathode ray tube. A shielded cable of predetermined length is coupled between the rectifier and a series resistance to provide the desired capacitance. The resistive element is covered with a sleeve of insulating material and is adapted for connection to the ultor connector.

Figure 2:
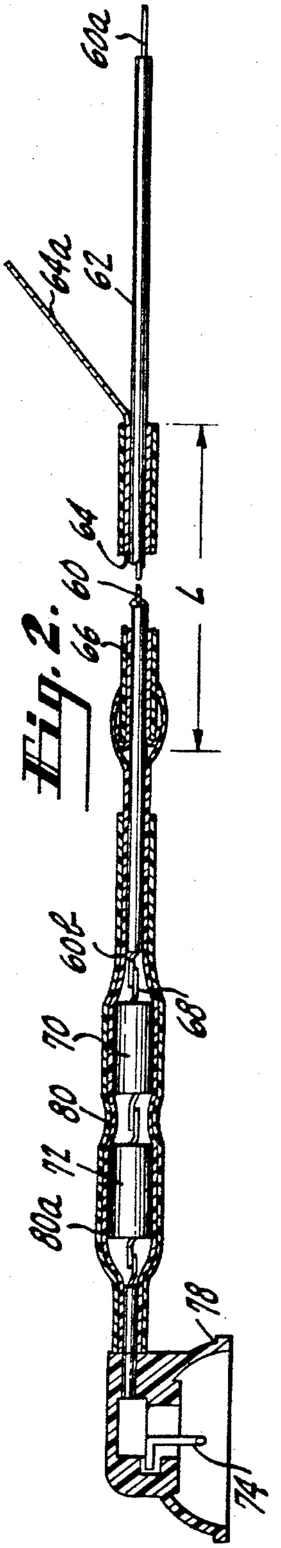

This invention relates to a high voltage cable assembly for coupling the high voltage electrode of a television kinescope to an associated high voltage generating circuit.

In U.S. patent application Ser. 450,894, now U.S. Patent No. 3,379,924 of L. R. Kirkwood and C. S. Liu, entitled, "Television Deflection Circuits," filed concurrently herewith, circuit means are described for protecting the horizontal output transistor in a television deflection circuit against high energy transients which may accompany undesired arcing in an associated high voltage generating circuit. In the Kirkwood and Liu application, a tarnsistor deflection and high voltage supply circuit for a television receiver is described wherein a step-up fly-back transformer is coupled in circuit with a horizontal output transistor amplifier for providing high voltage retrace pulses to a rectifier-filter capacitor combination. Typically, the filter capacitor constitutes the capacitance between the inner conductive coating (aquadag) and the outer conductive coating of the television receiver kinescope, the latter coating being coupled to chassis ground. The Kirkwood and Liu circuit further comprises a second capacitor having a substantially smaller capacitance than the filter (kinescope) capacitor, the second capacitor being connected directly between one electrode (the cathode) of the rectifier and chassis ground. A current limiting resistor is inserted in series from the junction of the second capacitor and the rectifier to the high voltage terminal of the filter capacitor (i.e. to the high voltage terminal of the kinescope). As stated in the Kirkwood and Liu application, the above-described circuit serves to prevent failure of the horizontal output transistor upon arcing in the high voltage rectifier while providing an acceptably regulated high voltage to the kinescope.

Care must be exercised, however, in determining the physical layout of the high voltage rectifier, the second capacitor and the current limiting resistor if conventional circuit components are utilized in the Kirkwood and Liu circuit. The cathode of the high voltage rectifier, both terminals of the current limiting resistor and one terminal of the second capacitor normally may be at a voltage in the neighborhood of 13,000 volts while the second terminal of the second capacitor is coupled to chassis ground. A sufficient spacing must be allotted between such high and low voltage terminals of the components and sufficient insulation must be provided for the high voltage leads extending from the rectifier to the components and back to the kinescope electrode in order to prevent breakdown and arcing between such components or leads and a low voltage point such as chassis ground.

Furthermore, in a typical application of the Kirkwood and Liu invention, the second capacitor, which may be of the order of twenty picofarads with a voltage rating of the order of thirty thousand volts, would be relatively expensive if a conventional discrete capacitor were used.

It is an object of the present invention, therefore, to provide a single high voltage cable assembly for coupling the high voltage or ultor electrode of a television kinescope to an associated high voltage rectifier wherein means are provided for protecting an associated horizontal output transistor against arcing in the high voltage circuit.

It is a further object of this invention to provide a relatively inexpensive high voltage cable assembly for use in connection with the high voltage supply in a television receiver, the supply being provided with a protective circuit which includes capacitance and current limiting resistance. It is a still further object of this invention to provide relatively inexpensive protection circuit means for a horizontal output transistor to protect such transistor against arcing in an associated high voltage generating circuit.

In accordance with the invention, a high voltage supply circuit for a television receiver is provided wherein a step-up flyback transformer is coupled to the combination of a rectifier and a filter capacitor to develop across the filter capacitor a high direct voltage. Preferably, the filter capacitor constitutes the capacitance between the inner and outer conductive coatings of the television kinescope. A high voltage cable assembly is coupled between the cathode of the rectifier and the high voltage terminal of the filter capacitor (i.e. of the kinescope). The high voltage cable assembly is arranged to provide a shunt capacitance substantially less than the capacitance of the filter capacitor and a series resistance for limiting current flow from the filter capacitor upon the occurrence of arcing in the rectifier. The high voltage cable assembly comprises an inner conductor surrounded by an insulative coating cable of withstanding a voltage substantially greater than the generated high voltage and an outer conductor such as a braided or spirally wrapped shield surrounding the insulative coating. The inner conductor, insulative coating and shield are cut to a predetermined length and exhibit a predetermined capacitance, the predetermined capacitance being substantially less than the capacitance of the filter capacitor. A resistive element is coupled in series relation to the inner conductive and an auxiliary insulative coating capable of withstanding voltage substantially in excess of the generated high voltage is fitted snugly over the resistive element and the connective leads thereof. The connective lead associated with that end of the resistive element remote from the inner conductor is connected to a spring clip connector, the spring clip connector being partially surrounded by an insulative cup arranged to fit upon the side of a television kinescope when the clip connector is coupled to the ultor electrode of the kinescope.

Figure 1:
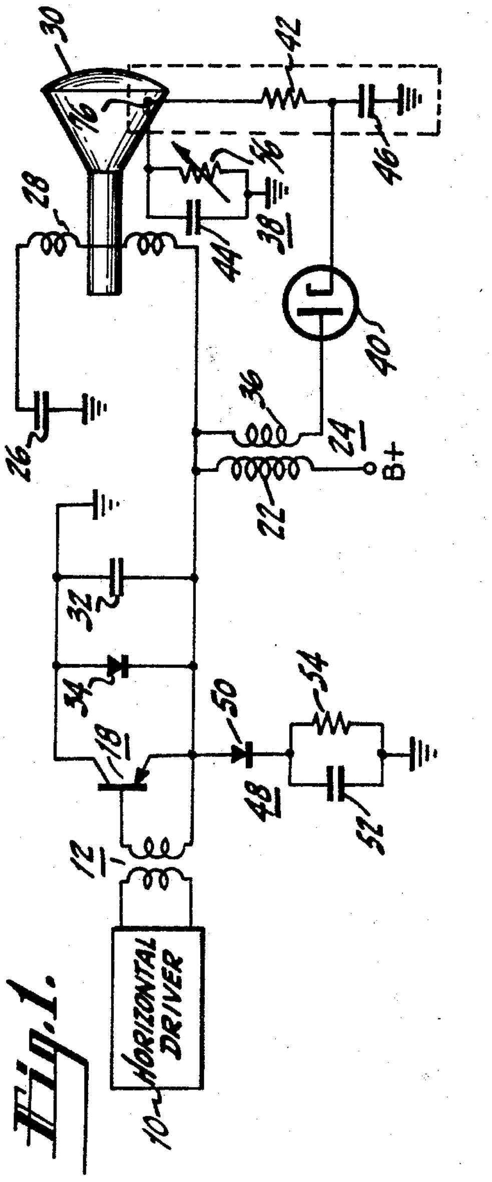

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

FIGURE 1 is a schematic circuit diagram of a portion of a transistor horizontal deflection and high voltage supply circuit wherein a high voltage cable assembly constructed in accordance with the present invention is particularly useful; and FIGURE 2 is an elevation, partly in section, of a high voltage cable assembly constructed in accordance with the present invention.

Referring to FIGURE 1 of the drawing, a horizontal deflection and high voltage supply circuit of the type described in the above-referenced Kirkwood and Liu application is shown. Since a high voltage cable assembly constructed in accordance with the present invention is particularly useful in connection with the Kirkwood and Liu circuit, that circuit now will be described briefly.

In the operation of the circuit shown in FIGURE 1, drive pulses recurring at the television horizontal deflection frequency are applied from a horizontal oscillator and driver circuit 10 via a transformer 12 to switch a horizontal output transistor 18 from an "on" condition at a time during the trace portion of a horizontal deflection cycle to an "off" condition during the retrace portion of such a deflection cycle. A deflection yoke 28 associated with a kinescope 30 is supplied, by means of the operation of transistor 18 in conjunction with a damper diode 34, a retrace capacitor 32, an S-shaping capacitor 26 and a voltage supply B+, with a current which varies in a substantially linear manner throughout the trace portion of each deflection cycle and, upon initiation of retrace, that current reverses rapidly in a substantially cosinusoidal manner. An electron beam produced in kinescope 30 is thereby deflected in a regularly recurring pattern across the phosphor-coated screen (not shown) of kinescope 30.

The rapid reversal of current which takes place during the retrace portion of each deflection cycle results in the production across a flyback transformer 24 of a relatively short duration high voltage pulse. This "flyback" pulse is stepped up by means of transformer 24 and applied to a high voltage rectifier 40. In accordance with the Kirkwood and Liu invention, the flyback pulse is rectified and filtered to produce a voltage of, for example, 13,000 volts by means of rectifier 40 and a filter circuit comprising a second capacitor 46, a resistor 42, a filter capacitor 44 and a resistor 56. Capacitor 44 represents the capacitance between the inner and outer conductive coatings of kinescope 30 which capacitance, for example, may be of the order of 500 picofarads. Resistor 56 represents the variable resistive load (i.e. ultor electrode voltage divided by electron beam current) of kinescope 30 upon the high voltage supply circuit, which resistance, for example, may be of the order of 65 megohms (13,000 volts/200 microamperes).

Capacitor 46 and resistor 42 are provided in the high voltage circuit 38, as described in the Kirkwood and Liu application, to substantially lessen the effect upon transistor 18 of spurious, internal arcing which may occur in rectifier 40, Resistor 42 serves to decrease the discharge current which would flow from capacitor 44 upon the occurrence of arcing in rectifier 40 and further to dissipate within circuit 38 at least a portion of the energy which otherwise would be fed back to transistor 18 in the event of such arcing. The resistance value of resistor 42 is selected sufficiently large (e.g. two megohms) so that transistor 18 is not destroyed. However, in order to prevent a substantial decrease in high voltage upon the addition of resistor 42, capacitor 46, having a capacitive value and hence an energy storage capability substantially lower than capacitor 44, but sufficiently large to maintain the regulation of the high voltage, is connected between the cathode of rectifier 40 and ground. Although the energy stored in capacitor 46 is fed back to transistor 18 upon the occurrence of arcing in rectifier 40, the capacitive value of capacitor 46 is selected sufficiently low so that its stored energy is insufficient to destroy transistor 18. For example, capacitor 46 may be of the order of twenty picofarads. Capacitor 46 serves to maintain capacitor 44 at a substantially constant voltage level, capacitor 46 being charged rapidly during each retrace interval and discharged slowly through resistor 42 into capacitor 44 during at least part of the remaining portion of each deflection cycle.

In accordance with the present invention, the required shunt capacitance of capacitor 46 and series resistance of resistor 42 in FIGURE 1 are provided by means of the unitary high voltage cable assembly shown in FIGURE 2.

Referring to FIGURE 2, the high voltage cable assembly comprises an inner conductor 60 which may, for example, be formed of seven strands of 0.010 inch diameter (AWG #22) copper wire. An extruded, close-fitting concentric wall of insulative material 62 such as a polymer of vinyl chloride or a heat stabilized polyethylene compound approximately 0.050 inch thick surrounds the inner conductor 60. A shielding wrap 64 of braided, woven or spirally applied wire substantially covers the outer surface of insulative material 62 and extends along a predetermined length L of the cable assembly.

The predetermined length L is selected according to the capacitance which is to be provided by the cable assembly. For example, where the materials mentioned above are used, a cable exhibiting a capacitance of thirty picofarads per linear foot is obtained. The shielding wrap 64 would then extend for approximately eight inches along the cable to provide a capacitance of twenty picofarads. Hence, the capacitance between the shielding wrap and the inner conductor corresponds to the capacitor 46 of FIGURE 1. A pig tail or connective portion 64*a* of shielding wrap 64 extends away from insulative coating 62 to permit electrical connection of shielding wrap 64 to chassis ground. A jacket 66 of, for example, an extruded thermoplastic vinyl material approximately 0.025 inch thick surrounds and protects shielding wrap 64 against physical damage.

One end 60*a* of conductor 60 is adapted for connection to the cathode of rectifier 40 by stripping away the insulative material 62 along, for example, one-half inch of conductor 60.

The opposite end 60*b* of conductor 60 is adapted in a similar manner for connection to one lead 68 of a resistor 70 which may, for example, be a cylindrical carbon composition resistor. As noted above in connection with FIGURE 1, the series resistor 42 typically may be of the order of two megohms. Furthermore, that resistor 42 must be able to withstand the peak voltage surges that will be encountered in the circuit (e.g. 15,000 volts). In order to maintain the outside diameter of the cable assembly shown in FIGURE 2 substantially constant over its entire length, it is preferable where a resistance of two megohms and a peak voltage rating as noted above is required, to connect a second resistor 72 in series with resistor 70, each resistor providing one megohm resistance and being rated for a peak applied voltage of approximately 10,000 volts. Hence, the resistors 70 and 72 correspond to the resistor 42 of FIGURE 1.

The end of resistor 72 remote from resistor 70 is conductively connected to a spring clip connector 74 adapted for engagement with the ultor electrode or high voltage terminal 76 (see FIGURE 1) of kinescope 30. An insulating rubber or plastic cup 78 substantially surrounds spring clip connector 74 and serves the twofold purpose of electrically insulating the high voltage terminal 76 and connector 74 while physically supporting and maintaining the cable assembly in the desired position between rectifier 40 and kinescope 30.

A flexible, heat-shrinkable insulative tubing or sleeve 80 such as polyethylene tubing is shrunk over resistors 70 and 72 and extends along insulative material 62 substantially to the end of shielding wrap 64 to prevent arcing between the resistors or their connective leads (all of which are at a high voltage) and points at lower voltage such as chassis ground. Tubing 80 may, for example, be of a type having a wall thickness of 0.025 inch, an initial expanded inside diameter of 0.312 inch and, after heating, a contracted inside diameter of 0.156 inch. Normally, such tubing shrinks to one-half its expanded inside diameter upon heating, for example, over an open gas flame for several seconds. A second appropriately sized heat shrinkable tubing 80*a* may be fitted over tubing 80 if required to obtain the necessary voltage breakdown rating.

The high voltage cable assemble constructed in accordance with the above description provides the desired shunt capacitance and series resistance at low cost with substantial protection against inadvertent human contact with a high voltage and protection against arcing resulting from close proximity of high and low voltage points in the circuit. Furthermore, the cable assembly provides the desired circuit parameters in a minimum amount of space, a feature desirable for use in a transistor television receiver.

While the invetnion has been described in terms of particular materials and dimensions, other materials and/or dimensions may be used. For example, the inner conductor 60 may be a solid conductor rather than stranded wire. The insulative material and jacket may be selected from a number of commonly used materials as noted above, the materials and dimensions being determined by the required voltage rating.

What is claimed is:

1. In a television receiver having a high voltage supply circuit including a rectifier, and further having an electron beam producing kinescope including an inner conductive coating, a high voltage terminal connected to said inner coating, and an outer conductive coating connected to chassis ground, a high voltage cable assembly for coupling said rectifier to said high voltage terminal comprising:

an inner conductor having a first end connected to said rectifier and a second end, a wall of insulative material capable of withstanding peak voltages greater than the normal operating difference between said high voltage terminal and chassis ground surrounding said inner conductor.

a conductive shield including a first portion wrapped around and substantially covering a predetermined length of said insulative material and a second portion separated from said insulative material and connected to chassis ground, first and second resistors coupled in series relation to said second end of said inner conductor, said resistors providing a resistance of the order of two megohms substantially less than the effective resistive load of said kinescope on said high voltage supply circuit, a tight fitting insulative sleeve capable of withstanding peak votlages greater than said normal operating difference surrounding said resistors and extending over at least a portion of said insulative material, and insulated electrical connecting means fastened to one of said resistors remote from said second end of said conductor for mating with said high voltage terminal, said inner conductor, said wall of insulative material and said conductive shield forming a capacitor exhibiting a capacitance of the order of twenty picofarads and substantially less than the capacitance between said inner and outer conductive coatings of said kinescope but sufficiently large to maintain substantially constant the high voltage produced at said high voltage terminal.

References Cited

UNITED STATES PATENTS

| | | | |
|---|---|---|---|
| 1,957,249 | 5/1934 | Dantscher | 315—8 |
| 2,849,641 | 8/1958 | Zarrow | 315—1 |

OTHER REFERENCES

Schade, Radio-Frequency Operated High-Voltage Supplies for Cathode Ray Tubes; Publication #St.-235, RCA Victor Division, Radio Corporation of America; April 1943; p. 161 cited.

Emerson chassis 120129-B; TV pp. 7-44 Emerson in volume 7 of the John F. Rider Television Manual.

ROBERT SEGAL, *Primary Examiner.*

U.S. Cl. X.R.

178—7.8